No. 730,352. PATENTED JUNE 9, 1903.
G. O. DRAPER.
AUTOMOBILE.
APPLICATION FILED DEC. 26, 1902.

NO MODEL.

Witnesses
Thomas J. Drummond
S. Wm. Lutton

Inventor
George O. Draper,
by Crosby Gregory
Atty's.

THE NORRIS PETERS CO., PHOTO-LITHO., WASHINGTON, D. C.

No. 730,352. Patented June 9, 1903.

UNITED STATES PATENT OFFICE.

GEORGE OTIS DRAPER, OF HOPEDALE, MASSACHUSETTS.

AUTOMOBILE.

SPECIFICATION forming part of Letters Patent No. 730,352, dated June 9, 1903.

Application filed December 26, 1902. Serial No. 136,525. (No model.)

*To all whom it may concern:*

Be it known that I, GEORGE OTIS DRAPER, a citizen of the United States, and a resident of Hopedale, county of Worcester, State of Massachusetts, have invented an Improvement in Automobiles, of which the following description, in connection with the accompanying drawings, is a specification, like figures on the drawings representing like parts.

In most automobiles the weight of the vehicle is considerably greater than the weight of the passengers which it is possible to carry, and the carrying of a few extra passengers, therefore, would not necessitate the employment of a larger or more powerful motor. As the bodies of automobiles are commonly constructed, however, there are accommodations for only about four passengers.

It is the object of my present invention to provide a novel form of body for automobiles, which will have an increased carrying capacity without enlarging the outside dimensions of the automobile as a whole.

In accordance with my invention I provide the body with a transversely-extending seat facing front, which is designed to be occupied by the person operating or steering the vehicle, and two longitudinally-extending seats at the rear of the transverse seat, said longitudinally-extending seats being situated back to back. The foot-rests for the longitudinally-extending seats extend over the rear wheels, and thus act as mud-guards for the latter. The space under the longitudinally-extending seats affords a large roomy compartment in which tools or luggage of any description may be carried. By this construction of body at least four extra persons can be conveniently carried without materially increasing the size of the automobile-body, and a space is afforded for the stowing away and carrying of a large quantity of luggage. Moreover, the passengers on the longitudinal seats are facing outwardly, and therefore their view will not be obstructed by the people sitting opposite, as is the case when the side seats face inwardly.

Figure 1:
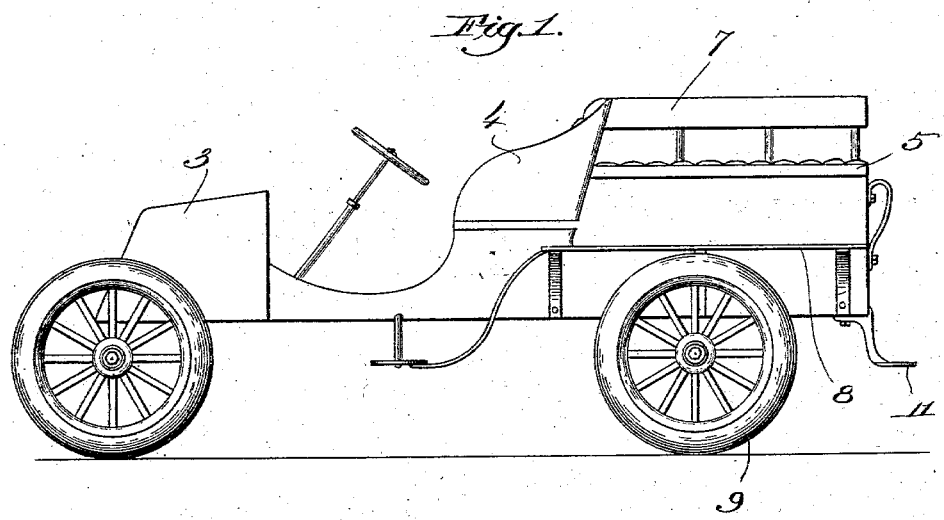
Figure 2:
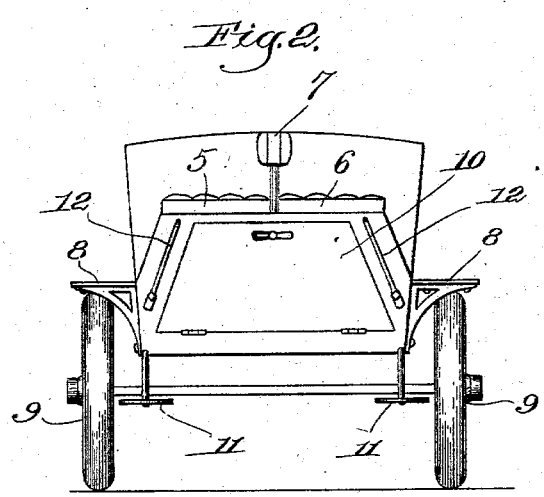

In the drawings, Figure 1 is a side view of my improved automobile, and Fig. 2 is a rear view thereof.

My improvements are applicable to almost any automobile, whether it be driven by steam, gasolene, electricity, or any other motive power. In the drawings I have shown my invention as applied to the type of automobile in which gasolene is employed as a motive power. The engine or motor may be situated in any convenient place in the body, though in the type of automobile herein illustrated it will preferably be situated at the front of the body and will be covered by the casing 3, as usual. Any suitable driving mechanism (not shown) may be employed to connect said engine to the driving-wheels.

Extending transversely across the vehicle-body is the usual seat 4, which faces the front and is within convenient reach of the steering mechanism 41, this seat being one which is occupied by the driver or chauffeur. To accommodate extra passengers, I provide the portion of the body back of the seat 4 with the two longitudinally-extending seats 5 and 6, which are divided by the central back-rest 7. 8 designates foot-rest portions for the said seats 5 and 6, the said foot-rest portions extending over the rear wheels 9, and thus serving the function of mud-guards in addition to their function as foot-rests. The space beneath the seats 5 and 6 constitutes a large roomy compartment, which may conveniently be employed as a place to carry luggage, tools, or any other matter, and access to said compartment may be had through a suitable door 10 at the rear of the body. 11 designates steps at the rear of the body, by means of which the passengers may mount to the side seats 5 and 6, and 12 designates suitable hand holds or grips for assisting the passengers in taking their seats. This special arrangement of longitudinal seats has many advantages when applied to automobile construction. In the first place the passengers on the seats 5 and 6 are facing outwardly instead of inwardly, and therefore each passenger has an unobstructed view of the scenery. Secondly, the arrangement of seats affords a large roomy compartment beneath the same, into which luggage of any description may be stowed, and, thirdly, the arrangement of seats is such that in case of accidents the passengers can alight with much greater facility than if the seats faced the other way. These advantages make this style of automobile especially applicable for touring purposes.

In case the motive power employed is steam the engine and boilers may be situated beneath the seat 4 and partially beneath the seats 5 and 6, if desired. In this case the door 10 would provide a convenient means of gaining access to the machinery of the automobile.

My invention is of such a nature that the bodies of many of the present automobiles may be changed over to include the novel points hereinafter claimed.

One point which I desire to emphasize is that by means of my invention the increased carrying capacity is secured without necessitating any increase in the width of the running-gear. This is made clear from an inspection of Fig. 2, from which it will be seen that even with my improved back-seat arrangement the greatest width of the body—i. e., the distance between the outer edges of the foot-rests 8—is no greater and is even less than the total width of the running-gear.

It will be understood that various changes may be made in the construction and details of the body without departing from the spirit of the invention as expressed in the appended claims.

Having described my invention, what I claim as new, and desire to secure by Letters Patent, is—

1. In an automobile, a body carrying a motor and having a transversely-extending seat facing the front and two longitudinally-extending seats situated directly back of the first-named seat, said latter seats facing outward, and foot-rests for the longitudinally-extending seats, said foot-rests extending over and serving as mud-guards for the rear wheels, the distance between the outer edges of said foot-rests being no greater than the total width of the running-gear.

2. In an automobile, a body carrying a motor for driving the vehicle and having a transversely-extending seat facing the front, and two longitudinally-extending seats back of the first-named seat, said latter seats facing outwardly, foot-rest portions for said latter seats extending over and acting as mud-guards for the rear wheels, and a compartment beneath said seats and having an opening thereto at the rear of the body.

In testimony whereof I have signed my name to this specification in the presence of two subscribing witnesses.

GEORGE OTIS DRAPER.

Witnesses:
E. D. BANCROFT,
ERNEST W. WOOD.